(12) United States Patent
Venkatakrishnan et al.

(10) Patent No.: US 9,533,894 B2
(45) Date of Patent: Jan. 3, 2017

(54) WATER FILTERING SYSTEM WITH TEMPERATURE SENSING

(71) Applicant: General Electric Company, Schenectady, NY (US)

(72) Inventors: Natarajan Venkatakrishnan, Louisville, KY (US); Stephen Bernard Froelicher, Shepherdsville, KY (US); Andrew Reinhard Krause, La Grange, KY (US); Mariano Pablo Filippa, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 124 days.

(21) Appl. No.: 14/052,852

(22) Filed: Oct. 14, 2013

(65) Prior Publication Data

US 2015/0101990 A1    Apr. 16, 2015

(51) Int. Cl.
*C02F 1/00* (2006.01)
*B01D 27/10* (2006.01)
*B01D 35/143* (2006.01)
*B01D 35/14* (2006.01)

(52) U.S. Cl.
CPC .............. *C02F 1/008* (2013.01); *C02F 1/003* (2013.01); *B01D 27/10* (2013.01); *B01D 35/14* (2013.01); *B01D 35/143* (2013.01); *B01D 35/1435* (2013.01); *C02F 2201/006* (2013.01); *C02F 2209/02* (2013.01); *C02F 2307/12* (2013.01); *F25D 2323/121* (2013.01)

(58) Field of Classification Search
CPC ......... C02F 1/00; C02F 1/008; C02F 2209/02; C02F 1/003; C02F 2307/12; C02F 2201/006; C02F 27/10; G01K 1/00; G01M 3/002; B01D 35/14; B01D 35/143; B01D 35/1435; B01D 27/10; F25D 2323/121
USPC ............ 210/85, 149, 742; 374/4; 137/59–62
See application file for complete search history.

(56) References Cited

U.S. PATENT DOCUMENTS

| 5,089,144 A | 2/1992 | Ozkahyaoglu et al. |
| 5,113,892 A * | 5/1992 | Hull .......................... E03B 7/10 137/238 |
| 5,190,666 A | 3/1993 | Bisconte |

(Continued)

FOREIGN PATENT DOCUMENTS

| EP | 1936305 | 6/2008 |
| WO | WO 83/02523 | 7/1983 |

(Continued)

OTHER PUBLICATIONS

PCT Search Report and Written Opinion issued in connection with corresponding Application No. PCT/US2014/054024 on Dec. 4, 2014.

*Primary Examiner* — Matthew O Savage
(74) *Attorney, Agent, or Firm* — Dority & Manning, P.A.

(57) ABSTRACT

A filtering system is provided that includes at least one temperature sensor for measuring the temperature of a filter cartridge. The temperature measurements can used to determine whether the filter cartridge is at an increased risk of suffering a leak due to a crack of other material failure caused by exposure to certain temperatures. More than one temperature sensor may be used. The temperature measurements can also be used to determine whether one or more corrective actions should be taken such as e.g., providing a notification to a user and/or shutting of a flow of fluid to the filter cartridge.

11 Claims, 8 Drawing Sheets

(56) References Cited

U.S. PATENT DOCUMENTS

| | | |
|---|---|---|
| 5,192,424 A | 3/1993 | Beyne et al. |
| 5,328,597 A | 7/1994 | Boldt, Jr. et al. |
| 6,009,404 A | 12/1999 | Eimer |
| 6,051,144 A | 4/2000 | Clack et al. |
| 6,303,031 B1 | 10/2001 | Senner |
| 6,355,177 B2 | 3/2002 | Senner et al. |
| 6,533,926 B2 | 3/2003 | Hawkins et al. |
| 6,537,444 B2 | 3/2003 | Wilberscheid et al. |
| 6,551,503 B2 | 4/2003 | Niers et al. |
| RE39,361 E | 10/2006 | Den Dekker |
| 7,481,917 B2 | 1/2009 | Ikeyama et al. |
| 7,638,042 B2 | 12/2009 | Astle et al. |
| 7,836,708 B2 | 11/2010 | Krause et al. |
| 8,118,997 B2 | 2/2012 | Ebrom et al. |
| 8,216,463 B1 * | 7/2012 | Baird .................... B01D 35/30 210/232 |
| 8,282,820 B2 | 10/2012 | Cur et al. |
| 2001/0023843 A1 * | 9/2001 | Senner ................... B01D 27/08 210/232 |
| 2004/0007516 A1 | 1/2004 | Fritze et al. |
| 2004/0251210 A1 | 12/2004 | Fritze et al. |
| 2005/0173323 A1 * | 8/2005 | Meuleners et al. ........... 210/184 |
| 2005/0251366 A1 * | 11/2005 | Kahn .................... G01N 33/18 702/188 |
| 2006/0011523 A1 | 1/2006 | Schrott et al. |
| 2006/0186031 A1 | 8/2006 | Fick et al. |
| 2007/0160108 A1 * | 7/2007 | Kent ............................... 374/54 |
| 2009/0046715 A1 * | 2/2009 | McCoy ........................ 370/389 |
| 2009/0071890 A1 | 3/2009 | Oranski et al. |
| 2011/0036782 A1 | 2/2011 | Dileo |
| 2011/0062060 A1 | 3/2011 | Royal et al. |
| 2012/0297817 A1 | 11/2012 | Krause et al. |
| 2013/0008838 A1 | 1/2013 | Burke et al. |

FOREIGN PATENT DOCUMENTS

| | | |
|---|---|---|
| WO | WO 97/38272 | 10/1997 |
| WO | WO 03/011426 | 2/2003 |
| WO | WO 03/084875 | 10/2003 |
| WO | WO 2004/037383 A1 | 5/2004 |
| WO | 2005073124 A2 | 8/2005 |
| WO | WO 2008/125530 | 10/2008 |

* cited by examiner

WATER FILTERING SYSTEM WITH TEMPERATURE SENSING

FIELD OF THE INVENTION

The subject matter of the present disclosure relates generally to a system for filtering a fluid such as water that uses one or more temperature sensors to protect against material failures.

BACKGROUND OF THE INVENTION

Fluid filter systems, particularly as used for water filtration, typically include a filter constructed with a media that removes unwanted particulates and other substances from the fluid. Filtration can be based on size exclusion, adsorption, and other mechanisms. Such filter systems can be provided as stand-alone systems installed e.g., in cabinetry or provided as part of an appliance as a refrigerator.

Typical fluid filter systems can include a filter cartridge having a filter element installed within a filter housing. The filter element may be constructed from a variety of different materials. The filter housing contains the filter element and fluid that is being filtered. The filter element may be replaceable.

During use, the filter cartridge can be exposed to a wide range of temperatures and pressures. For example, depending upon the pressure of the water supplied, the filter cartridge may experience pressures in the range of e.g., 20 psi to 120 psi or higher. Depending upon where the filter cartridge is located, it may experience temperatures ranging from e.g., 30° F. to 150° F. Other pressure and temperature ranges may also be experienced. The application will generally dictate the ranges that will be encountered. For example, a filter cartridge located in a space that is not air-conditioned may experience freezing temperatures in the winter and relatively high temperatures in the summer Exposure to such wide ranging temperatures and/or pressures can cause substantial stress on the filter cartridge. For example, freezing temperatures can cause the material of the filter cartridge to crack. Higher temperatures and pressures can cause the material of the filter cartridge to creep, which can also result in cracks. Such cracks can lead to undesirable water leaks. Depending upon the location of the filter and/or whether a user is present, the water leak may not be readily discovered until after a significant amount of water has leaked from the system.

Accordingly, a filtering system that can measure one or more temperatures in the filter cartridge would be useful. More particularly, a filtering system that can measure one or more temperatures and use such temperature measurements to determine if the filter cartridge is at increased risk of a material failure that could result in a leak would be particularly useful. Such a system that can also take one or more corrective steps would also be beneficial.

BRIEF DESCRIPTION OF THE INVENTION

The present invention provides a filtering system that includes at least one temperature sensor for measuring the temperature of a filter cartridge. The temperature measurements can be used to determine or predict whether the filter cartridge is at an increased risk of suffering a leak due to a crack or other material failure caused by exposure to certain temperatures. More than one temperature sensor may be used. The temperature measurements can also be used to determine whether one or more corrective actions should be taken such as e.g., providing a notification to a user and/or closing the flow of fluid to the filter cartridge. Additional aspects and advantages of the invention will be set forth in part in the following description, or may be apparent from the description, or may be learned through practice of the invention.

In one exemplary embodiment, the present invention provides a fluid filtration system. The system includes a filter manifold and a filter cartridge removably attached to the filter manifold. The filter cartridge has a filter housing. A filter element is received into the filter housing. A first temperature sensor is configured to detect the temperature of the filter cartridge.

In another exemplary embodiment, the present invention provides a fluid filtering system. The system includes a filter manifold having a filter manifold body, a fluid inlet and a fluid outlet adapted for coupling the filter manifold to a fluid supply system, a fluid return port in fluid connection with the fluid outlet. A fluid delivery port is positioned proximate to the fluid return port with the fluid delivery port in fluid communication with the fluid inlet. A filter cartridge is removably attached to the filter manifold. The filter cartridge includes a filter housing and a filter element received into the filter housing. A filter outlet provides for a flow of fluid from the filter element out of the filter housing and into the fluid return port, and a filter inlet is positioned proximate to the filter outlet and in fluid connection with the fluid delivery port of the filter manifold. A first temperature sensor is configured for measuring the temperature of the filter cartridge.

In another exemplary aspect, the present invention provides a method of operating a fluid filtering system. The fluid filtering system has a filter cartridge received into a filter manifold. The filter cartridge has a first temperature sensor configured for measuring the temperature of the filter cartridge. The method includes the steps of measuring the temperature of the filter cartridge using the first temperature sensor; using the temperature measurements to predict material failures of the filtration system based on the temperature measurements; and executing one or more corrective actions if a material failure is predicted.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
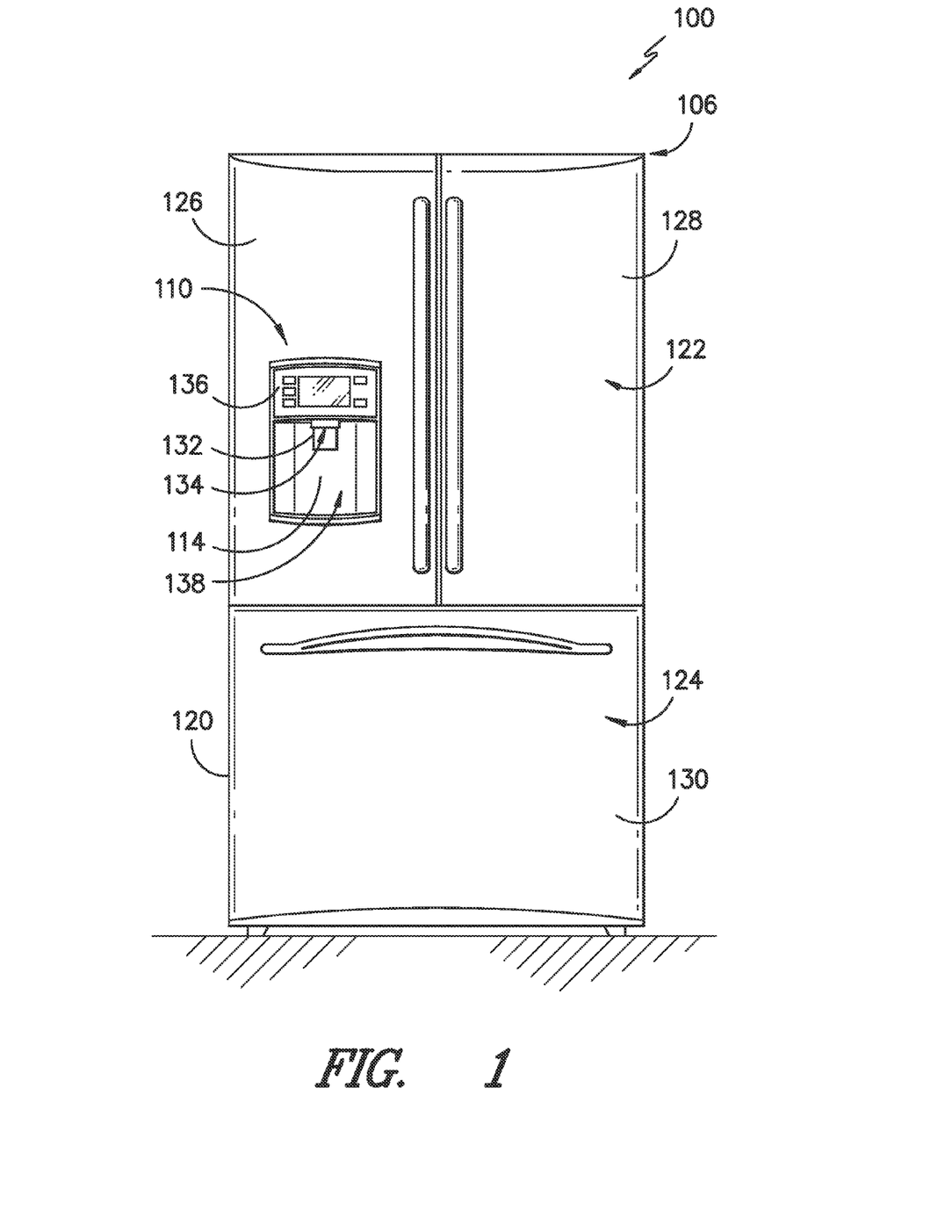
FIG. 1 provides a front view of an exemplary refrigerator appliance as may be equipped with a fluid filter assembly of the present invention.

FIG. 1 is a front view of an exemplary embodiment of a refrigerator appliance 100 as may be equipped with an exemplary fluid filter assembly of the present invention. However, as will be understood using the teachings disclosed herein, the fluid filter assembly (including the filter cartridge) of the present invention may be used with other refrigerator appliance configurations as well as other types of appliances. It may also be used in applications other than appliances as well. For example, the filtering system of the present invention could be installed under a kitchen sink or as part of a whole housing filtration system. As such, refrigerator appliance 100 is provided only by way of example of an application of the exemplary fluid filtration system of the present invention.

Refrigerator appliance 100 includes a cabinet or housing 120 defining an upper fresh food chamber 122 and a lower freezer chamber 124 arranged below the fresh food chamber 122. As such, refrigerator appliance 100 is generally referred to as a bottom mount refrigerator. In this exemplary embodiment, housing 120 also defines a mechanical compartment (not shown) for receipt of a sealed cooling system. Using the teachings disclosed herein, one of skill in the art will understand that the present invention can be used with other types of refrigerators (e.g., side-by-sides).

Refrigerator doors 126, 128 are rotatably hinged to an edge of housing 120 for accessing fresh food chamber 122. A freezer door 130 is arranged below refrigerator doors 126, 128 for accessing freezer chamber 124. In the exemplary embodiment, freezer door 130 is coupled to a freezer drawer (not shown) that is slidably mounted within freezer chamber 124.

Refrigerator appliance 100 includes a dispensing assembly 110 for dispensing water and/or ice. Dispensing assembly 110 includes a dispenser 114 positioned on an exterior portion of refrigerator appliance 100. Dispenser 114 includes a discharging outlet 134 for accessing ice and water. An activation member 132 is mounted below discharging outlet 134 for operating dispenser 114. In FIG. 1, activation member 132 is shown as a paddle. However, activation member 132 may be any other suitable mechanism for signaling or initiating a flow of ice and/or water into a container within dispenser 114, e.g., a switch or button. A user interface panel 136 is provided for controlling the mode of operation. For example, user interface panel 136 includes a water dispensing button (not labeled) and an ice-dispensing button (not labeled) for selecting a desired mode of operation such as crushed or non-crushed ice.

Discharging outlet 134 and activation member 132 are an external part of dispenser 114, and are mounted in a recessed portion 138 defined in an outside surface of refrigerator door 126. Recessed portion 138 is positioned at a predetermined elevation convenient for a user to access ice or water and enabling the user to access ice without the need to bend-over and without the need to access fresh food chamber 122. In the exemplary embodiment, recessed portion 138 is positioned at a level that approximates the chest level of a user.

Figure 2:
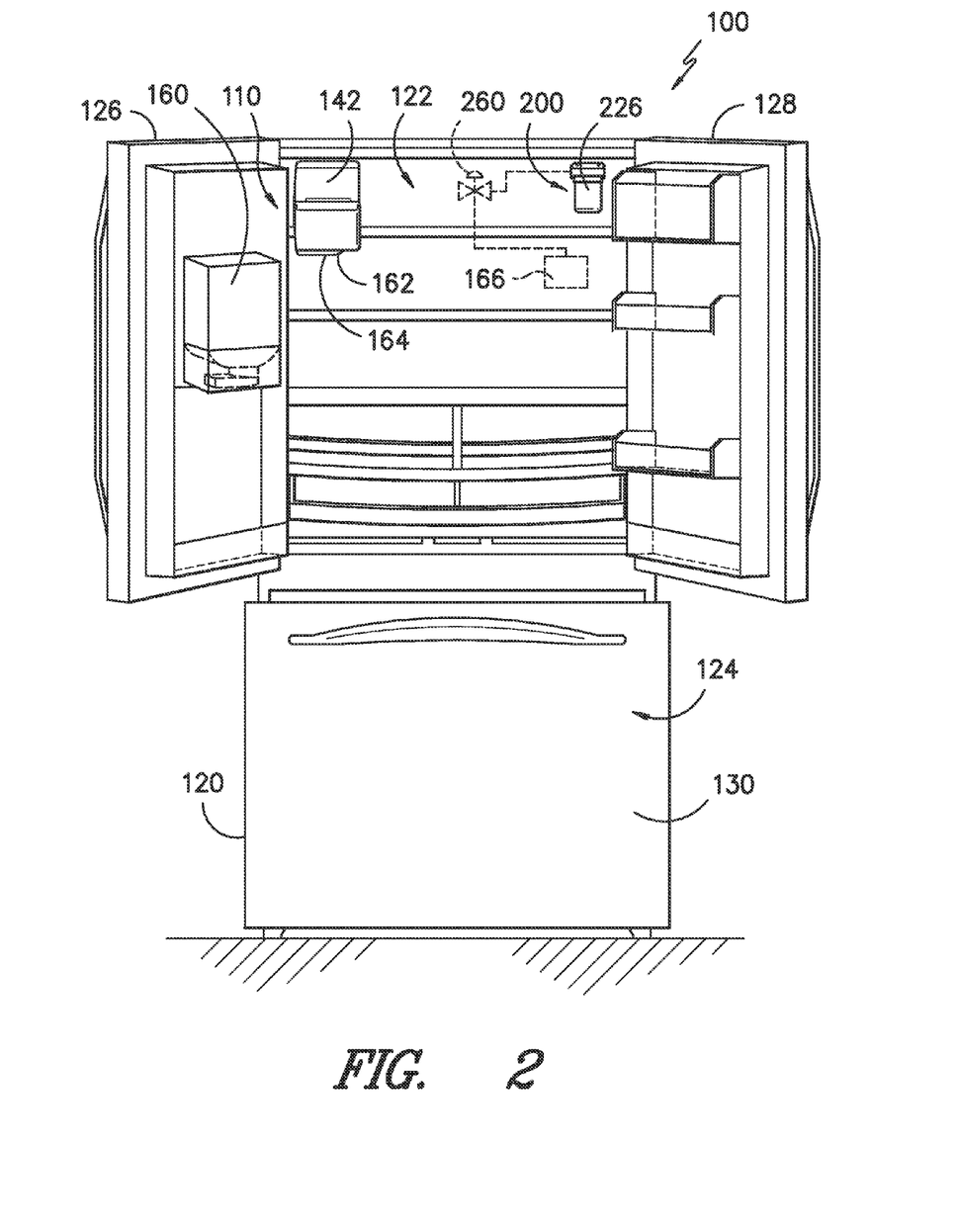
FIG. 2 provides a front view of the refrigerator appliance of FIG. 1 with refrigerator doors in an open position.

FIG. 2 is a perspective view of refrigerator appliance 100 having refrigerator doors 126, 128 in an open position to reveal the interior of the fresh food chamber 122. As such, certain components of dispensing assembly 110 are illustrated. Dispensing assembly 110 includes an insulated housing 142 mounted within chamber 122. Due to insulation surrounding insulated housing 142, the temperature within insulated housing 142 can be maintained at levels different from the ambient temperature in the surrounding fresh food chamber 122.

In particular, insulated housing 142 is constructed and arranged to operate at a temperature that facilitates producing and storing ice. Insulated housing 142 contains an ice maker (not shown) for creating ice and feeding the same to a receptacle 160 that is mounted on refrigerator door 126. As illustrated in FIG. 2, receptacle 160 is placed at a vertical position on refrigerator door 126 that will allow for the receipt of ice from a discharge opening 162 located along a bottom edge 164 of insulated housing 142 when refrigerator door 126 is in a closed position (shown in FIG. 1). As refrigerator door 126 is closed or opened, receptacle 160 is moved in and out of position under insulated housing 142.

Operation of the refrigerator appliance 100 is regulated by a controller 166 that is in communication with (or operatively coupled with) user interface panel 136 and/or activation member 132 (shown in FIG. 1). User interface panel 136 provides selections for user manipulation of the operation of refrigerator appliance 100 such as e.g., selections between whole or crushed ice, chilled water, and/or other options as well. In response to user manipulation of the user interface panel 136, controller 166 operates various components of the refrigerator appliance 100. Controller 166 may include a memory and one or more microprocessors, CPUs or the like, such as general or special purpose microprocessors operable to execute programming instructions or microcontrol code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor.

Controller 166 may be positioned in a variety of locations throughout refrigerator appliance 100 in addition to the location shown in FIG. 2. For example, controller 166 may be located within or beneath the user interface panel 136 on refrigerator door 126. In such an embodiment, input/output ("I/O") signals may be routed between the controller and various operational components of refrigerator appliance 100. In one exemplary embodiment, the user interface panel 136 may represent a general purpose I/O ("GPIO") device or functional block. In another exemplary embodiment, the user interface 136 may include input components, such as one or more of a variety of electrical, mechanical or electromechanical input devices including rotary dials, push buttons, and touch pads. The user interface panel 136 may be in communication with the controller via one or more signal lines or shared communication busses.

Refrigerator appliance 100 also includes an exemplary fluid filter assembly or fluid filtration system 200 that filters water coming into refrigerator appliance 100 from a water supply (not shown), such as a municipal water source or a well. Fluid filtration system 200 can remove contaminants, such as chlorine, chloroform, lead, arsenic, pharmaceuticals, microbes, and/or other undesirable substances, from water supplied to refrigerator appliance 100. In particular, fluid filter assembly 200 can supply filtered water to the ice maker within insulated housing 142 and/or discharging outlet 134. As will be understood by those skilled in the art and as used herein, the term "water" includes purified water and solutions or mixtures containing water and, e.g., elements (such as calcium, chlorine, and fluorine), salts, bacteria, nitrates, organics, and other chemical compounds or substances.

For this exemplary embodiment, fluid filtration system 200 is shown positioned within fresh food chamber 122. However, fluid filtration system 200 may also be located e.g., on the exterior of refrigerator 100, on a surface adjacent to refrigerator 100, connected into a water supply line (not shown) providing fluid to refrigerator 100, and other locations as well. Also, as stated above, filter assembly 200 could also be located under a sink, configured as part of a whole house filtration system, or otherwise configured for other applications as well.

Referring now to FIGS. 3 through 7, this exemplary embodiment of fluid filtration system 200 includes a filter manifold 202 having a filter manifold body 204. A fluid inlet 206 and fluid outlet 208 are provided for a flow of unfiltered fluid into filter assembly 200 (arrow I) and a flow of filtered fluid out of filter assembly 200 (arrow O), respectively. Fluid inlet 206 and fluid outlet 208 are adapted for coupling filter manifold 202 to a fluid supply system such as e.g., the piping system within a user's dwelling that may be connected with a well or municipal water supply. By way of example, fluid inlet 206 and fluid outlet 208 may be equipped with slip fittings, threads, fasteners, and/or other mechanisms for attachment. Apertures 210 allow for connection of filter assembly 200 to a wall, cabinet, or other surface. Other methods of attachment may also be used.

Figure 5:
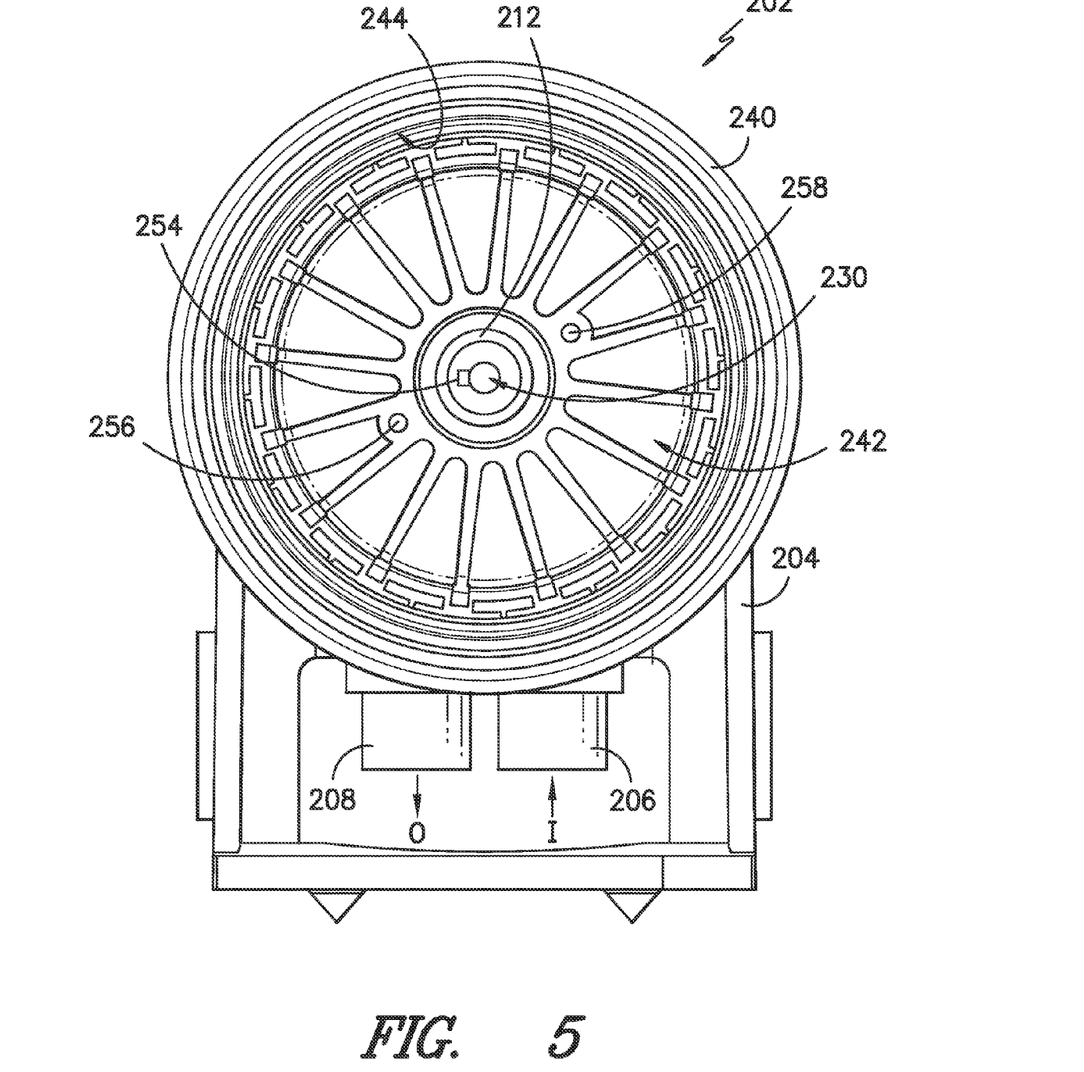
FIG. 5 is a bottom view of the exemplary fluid filter assembly of FIG. 3 with a portion of a filter housing removed to more clearly reveal certain internal components.
Figure 6:
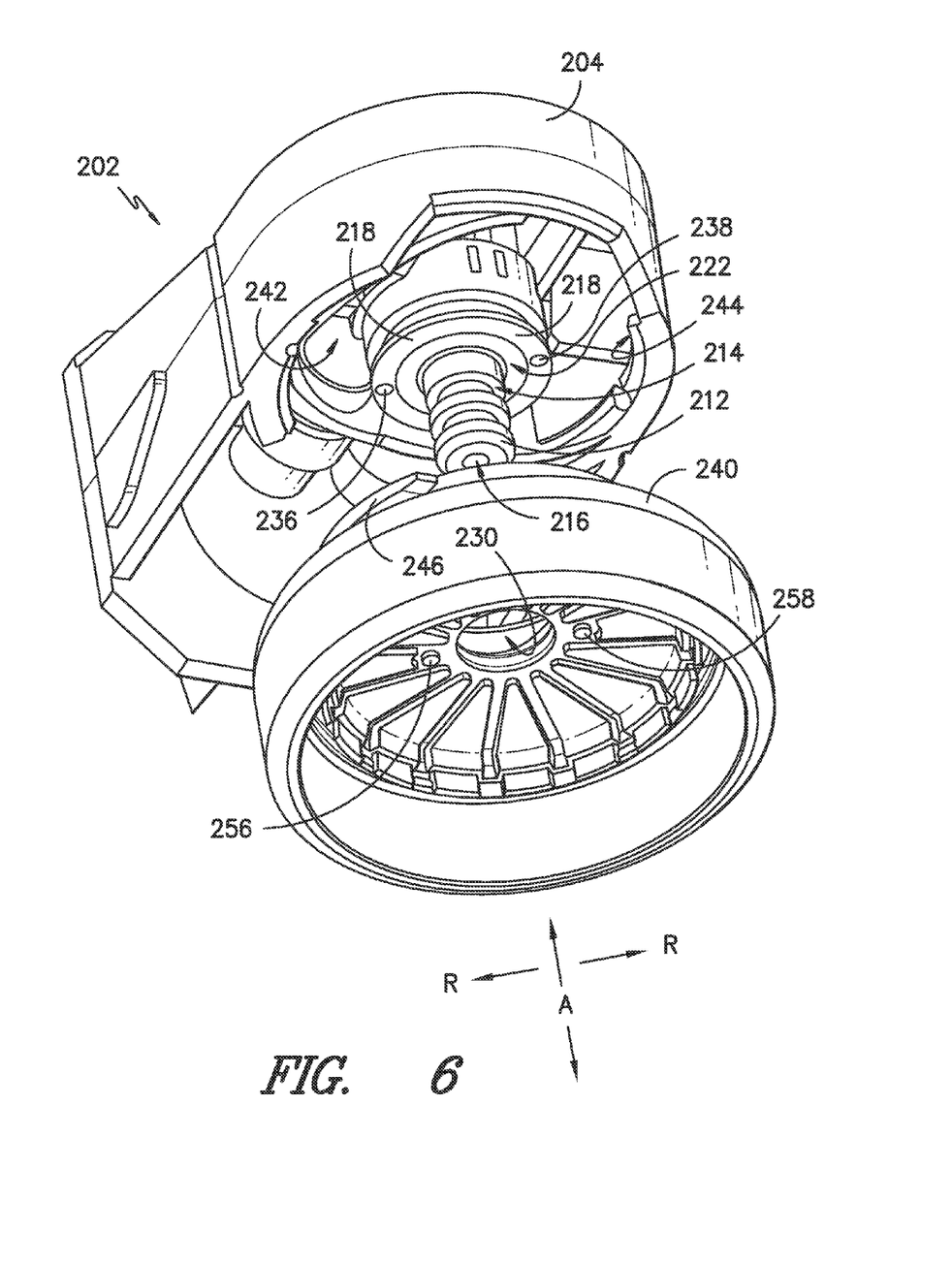
FIG. 6 provides an exploded and perspective view of the exemplary fluid filter assembly of FIG. 5.
Figure 7:
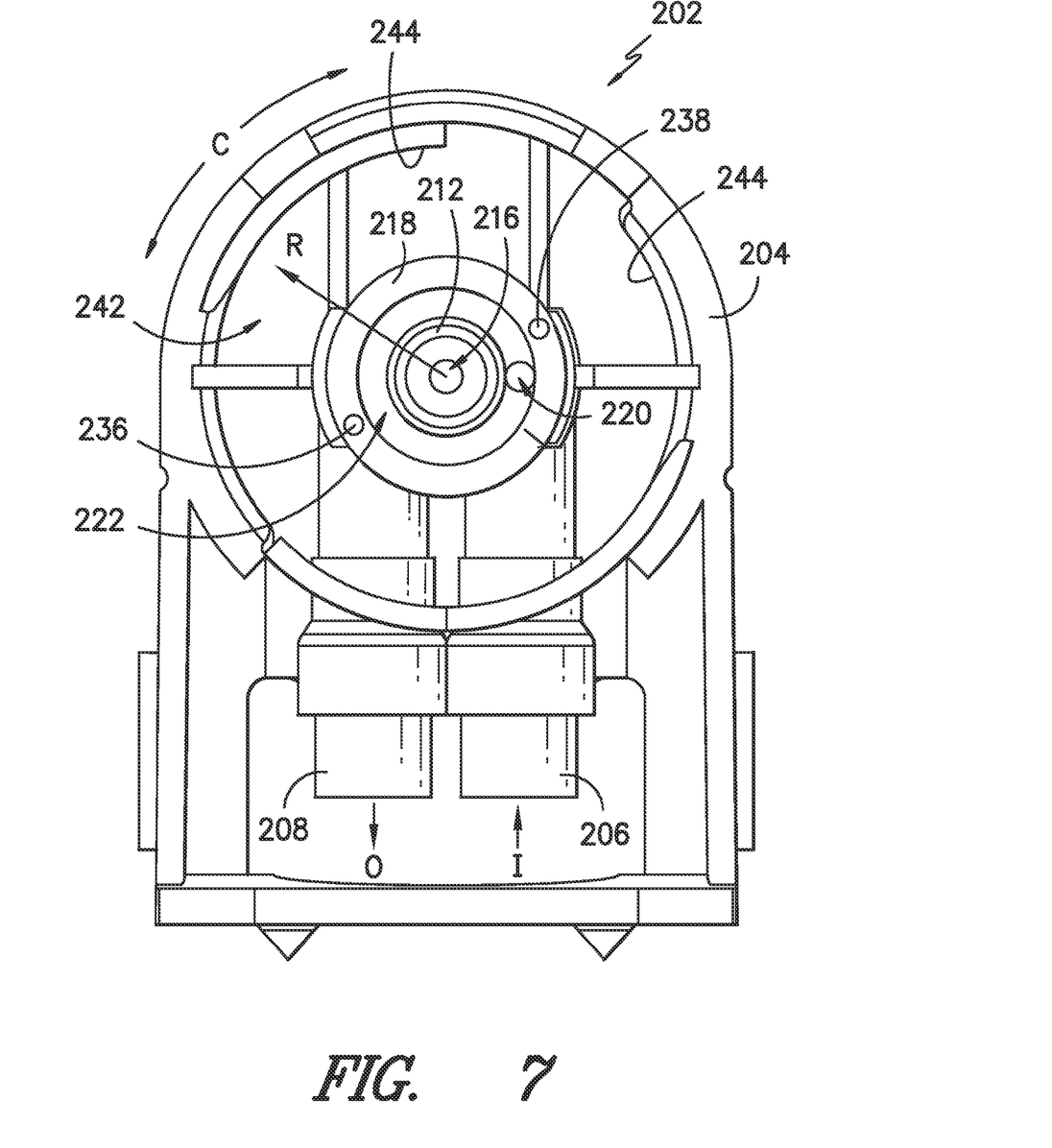
FIG. 7 is a bottom view of an exemplary filter manifold as provided with the exemplary fluid filter assembly of FIG. 3.

In this exemplary embodiment, filter manifold 202 includes a boss 212 that projects from filter manifold body 204 along an axial direction A (FIGS. 5 through 7). Boss 212 defines a fluid return port 216 that is in fluid connection with fluid outlet 208 whereby filtered fluid may be delivered from a filter cartridge 224 (FIG. 3) to fluid outlet 208. Boss 212 also defines a plurality of grooves 214 for the receipt of e.g., O-ring seals to ensure a fluid seal when boss 212 is received into filter cartridge 224 as will be further described. In other exemplary embodiments of the invention, the boss 212 may be located on filter cartridge 224 and a receiving port provided in filter manifold 202 for receipt of boss 212. In still other embodiments of the invention, filter assembly 200 may not include a boss as some other mechanism may be provided for connecting the flow of filtered fluid from cartridge 224 with filter manifold 202. Other configurations, including different shapes and connections, may be used for cartridge 224 and manifold 202 as well.

As shown in FIG. 7, a fluid delivery port 220 is also positioned proximate to boss 212. Fluid delivery port 220 is in fluid connection with fluid inlet 206 so as to provide unfiltered fluid into filter cartridge 224. For this exemplary embodiment, fluid delivery port 220 is positioned radially inward (see radial direction R in FIGS. 6 and 7) of an annular surface 218 where a pair of electrical contacts 236 and 238 are positioned—the function of which will be further described herein.

Figure 3:
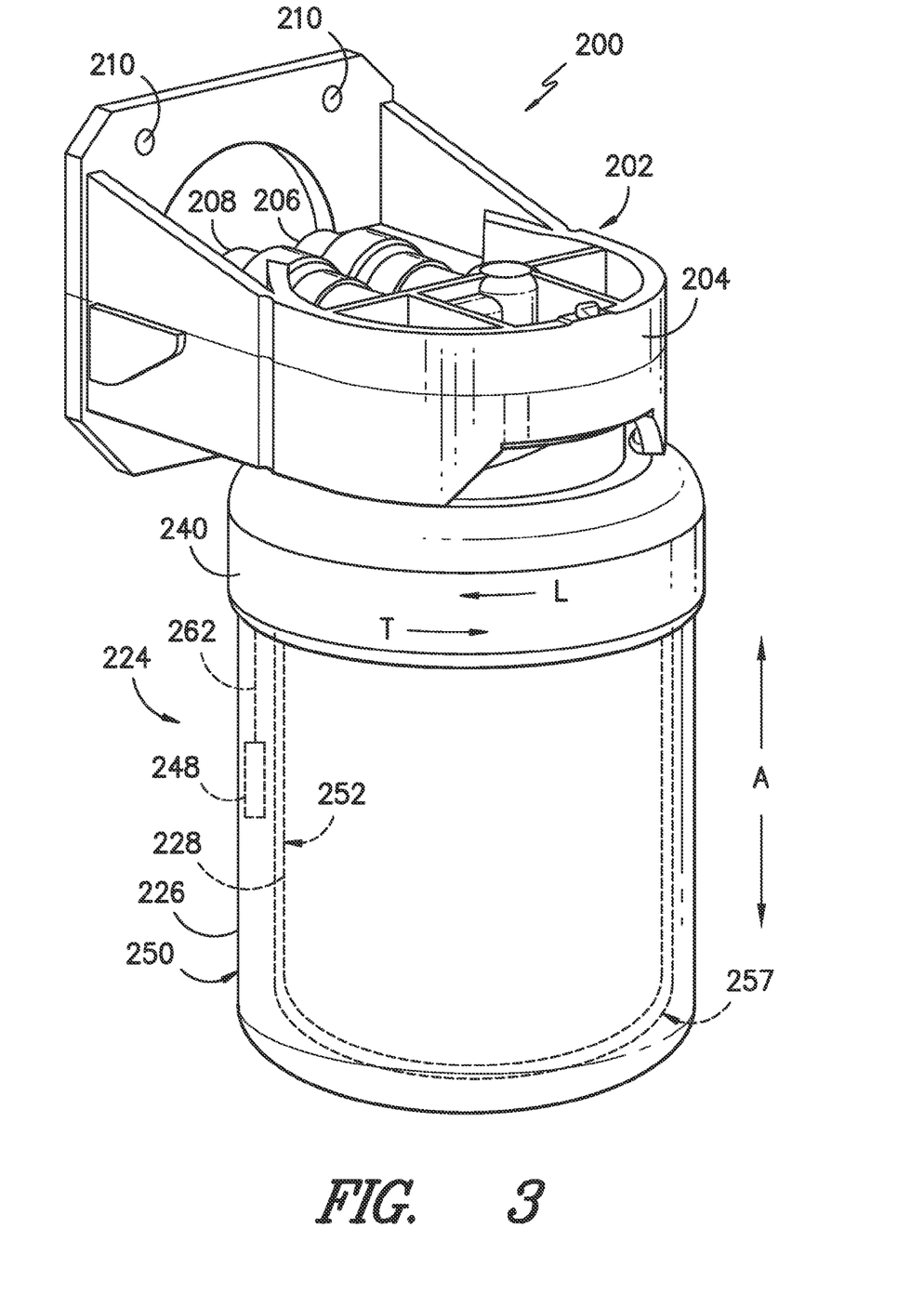
FIG. 3 is a perspective view of an exemplary embodiment of a fluid filter assembly of the present invention.
Figure 4:
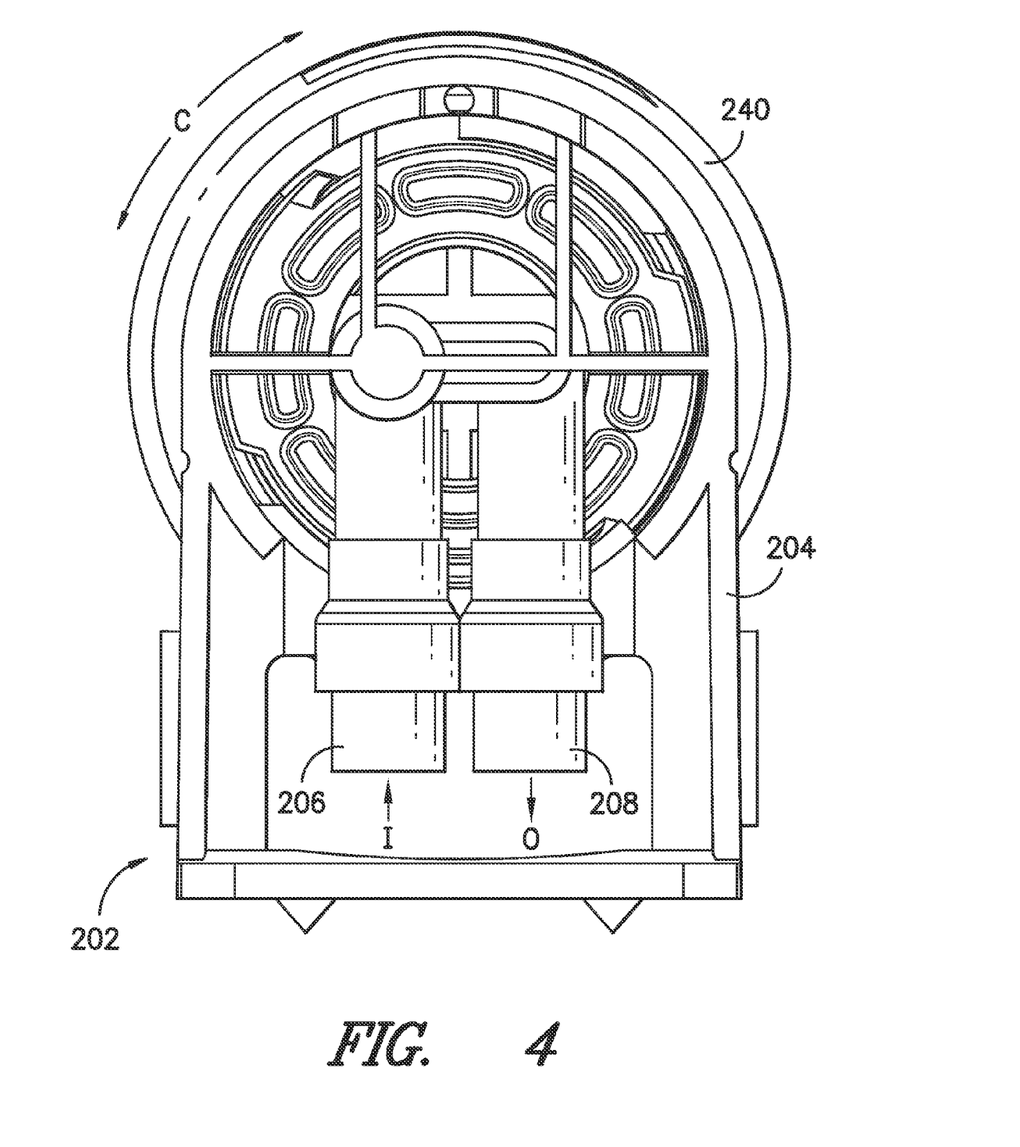
FIG. 4 provides a top view of the exemplary fluid filter assembly of FIG. 3.

Filter manifold 202 also includes a groove 222 that extends circumferentially around boss 212. Fluid delivery port 220 is positioned within groove 222 (FIG. 7). When filter cartridge 224 is installed into filter manifold 202 as shown in FIG. 3, groove 222 is located adjacent to a receiving surface 264 (FIG. 8) on filter top 240 and provides for a flow of fluid from fluid delivery port 220 to be distributed over receiving surface 264 and into filter cartridge 224. As such, groove 222 is useful for preventing or minimizing clogs that may be caused by particulates or other matter in the unfiltered fluid provided through fluid inlet 206. Alternatively, or in addition thereto, a similar groove can also be located on receiving surface 264.

As shown in FIG. 3, for this exemplary embodiment, filter cartridge 224 includes a filter housing 226 defining a chamber 257 into which a filter element 228 is received. Filter element 228 may be constructed from a variety of different types of filter media including textiles, resins, webs, activated carbon, and other components as well. Filtration with filtering element 228 may be based upon e.g., size exclusion, adsorption, and/or other mechanisms. While a variety of different constructions may be used, filter element 228 may be cylindrically-shaped and configured so that fluid flows radially inward towards a center of filter element 228 as particulates or other matter are removed by the filter media.

Figure 8:
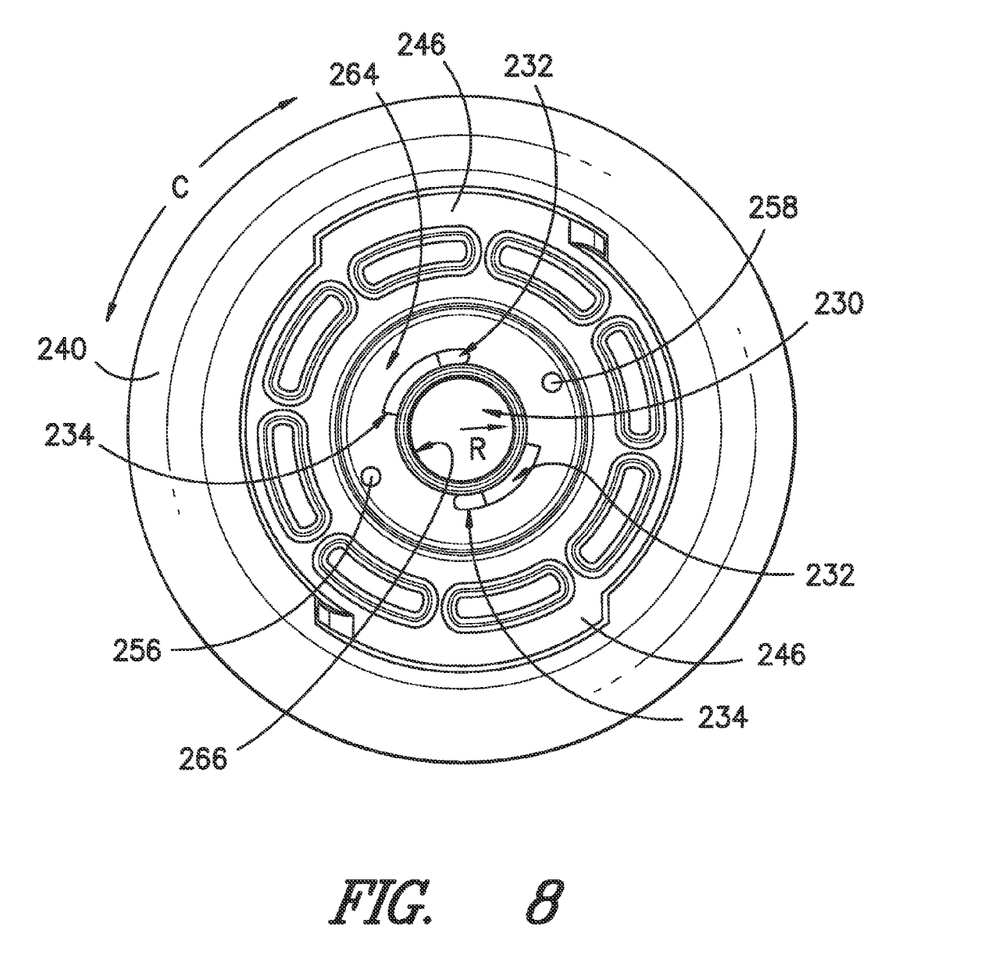
FIG. 8 is a top view of an exemplary filter cartridge as used with the exemplary fluid filter assembly of FIG. 3.

Turning to FIG. 8, filter cartridge 224 includes a filter outlet 230 positioned along a centerline C/L of filter cartridge 224 and defined by a filter top 240. Filter outlet 230 receives boss 212 of filter manifold 202 and provides a surface 266 for sealing with e.g., O-rings in grooves 214 (FIG. 6). Once filter cartridge 224 is installed in filter manifold 202, fluid outlet 230 (FIG. 8) is fluidly connected (i.e. in fluid communication) with the fluid return port 216 defined by boss 212 (FIG. 6).

Continuing with FIG. 8, filter cartridge 224 also includes a filter inlet 232 in the form of multiple openings 234 in filter top 240 that are in fluid connection with fluid delivery port 220 when filter cartridge 224 is properly installed. Accordingly, unfiltered fluid from fluid delivery port 220 may be delivered into chamber 257 for filtration by filter element 228. Although only two openings 234 are shown, multiple openings may be provided having shapes and locations different from that shown.

As shown in FIGS. 3, 5, and 6, filter cartridge 224 is received into a recess 242 in filter manifold 202. Filter top 240 and filter manifold body 204 are provided with threads 244 and 246 (FIG. 6), respectively, for the removable connection of filter cartridge 224 to filter manifold 202. Threads 244 and 246 are provided by way of example only. Other mechanisms may be used for installation of filter cartridge 224.

Referring now to FIG. 3, fluid filtration system 200 includes a first temperature sensor 248 that is configured to detect the temperature of the filter cartridge 224. More particularly, for this exemplary embodiment, first temperature sensor 248 is embedded in the material used for the construction of filter housing 226. In alternative embodiments, first temperature sensor 248 could be mounted on the exterior surface 250, interior surface 252, or other locations that allow for the measurement of the temperature of the housing 226 of filter cartridge 224. As such, first temperature sensor 248 can provide intermittent or continuous temperature measurements of filter housing 226 during operation of fluid filtration system 200. One or more leads 262 or other connections can be used to provide communication between first temperature sensor 248 and controller 166. In other exemplary embodiments, first temperature sensor 248 can be located in positions other than what is shown for purposes of measuring the temperature of filter cartridge 224 and more than one temperature sensor may be used for such purpose as well.

As shown in FIG. 5, in this exemplary embodiment, fluid filtration system 200 also includes a second temperature sensor 254 positioned so that it can measure the temperature of filtered fluid exiting filter cartridge 224 through filter outlet 230. For this exemplary embodiment, second temperature sensor 254 is embedded in the material used for construction of filter top 240 so that it is adjacent to filter outlet 230. In other embodiments, second temperature sensor 254 may positioned within fluid outlet 230 or other locations that allow for the measurement of the temperature of filtered fluid exiting filter cartridge 224. Second temperature sensor 254 can provide intermittent or continuous temperature measurements of the filtered fluid passing through fluid outlet 230 during operation of filtration system 200. One or more leads (not shown) or other connections may be used to provide communication between second temperature sensor 254 and controller 166. In other exemplary embodiments, second temperature sensor 254 can be located in positions other than what is shown for purposes of measuring the temperature of fluid in filter cartridge 224 and more than one temperature sensor may be used for such purpose as well.

A variety of different types of temperature sensors may be used for sensors 248 and 254. For example, resistance temperature detectors, thermocouples, and other types may be used. It should also be understood that, in certain embodiments, the present invention can also include one or more temperature sensors (such as first temperature sensor 248) for measuring the temperature of filter cartridge 224 and may not include additional sensors for measuring the temperature of the filtered fluid.

During operation of fluid filtration system 200, first temperature sensor 248 measures the temperature of filter cartridge 224 while second temperature second 254 measures the temperature of fluid exiting through fluid outlet 230. Controller 166 is in communication with temperature sensors 248 and 254 and, therefore, receives temperature measurements from one or both of first temperature sensor 248 and second temperature sensor 254. By way of example, temperature sensors 248 and 254 can be connected electrically with a pair of contacts 256 and 258 (FIGS. 5, 6, and 8) positioned in filter top 240. In turn, these contacts 256 and 258 physically contact, and electrically connect with, electrical contacts 236 and 238 (FIGS. 6 and 7) when filter cartridge 224 is properly installed into filter manifold 202. In turn, contacts 238 and 238 are electrically connected, or otherwise in communication with, controller 166 so that temperature measurements from temperature sensors 248 and 254 can be communicated thereto. Controller 166 uses the temperature measurements from one or both of temperature sensors 248 and 254 to make determinations regarding whether the material used in the construction or filter cartridge 224, filter manifold 202, or both, has been exposed to temperatures that could lead to material failure and, therefore, fluid leaks.

For example, controller 166 could be programmed with one or more algorithms or models that use a history of temperature measurements (i.e. multiple temperature measurements over time from one or both of temperature sensors 248 and 254) to predict when material(s) used in the construction of filter cartridge 224 potentially might suffer a failure by cracking, rupturing, or otherwise so as to cause a fluid leak. Such predictive models can be developed e.g., empirically based on the material of construction used for filter cartridge 224 when exposed to a range of temperatures and pressures as may be encountered during operation of filtration system 200. Other types of models may be used as well.

Controller 166 can also be programmed to take one or more corrective actions in the event controller 166 determines a failure is likely or has occurred. For example, referring to FIG. 1, controller 166 could provide a signal to a valve 260 controlling the flow of fluid supplied to filter manifold 202 and filter cartridge 224. The signal causes valve 260 to shut off the flow of fluid. Alternatively, or in addition, thereto, controller 166 could signal e.g., user interface panel 136 to provide a visible or audible (or both) notification to the user to close off the flow of fluid or otherwise warn of a failure. Other corrective actions may be used as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fluid filtration system, comprising:
a filter manifold defining a fluid inlet and a fluid outlet;
a valve in upstream fluid communication with the filter manifold to control the flow of fluid thereto;
a filter cartridge attached to the filter manifold, the filter cartridge having a filter housing defining a chamber, the filter cartridge defining an outlet for directing the flow of fluid out of the filter cartridge;
a filter element received into the chamber of the filter housing upstream from the filter outlet;
a first temperature sensor configured to detect the temperature of the filter cartridge, the first temperature sensor being embedded in the filter housing;
a second temperature sensor for measuring the temperature of fluid passing through the filter outlet, the second temperature sensor being positioned downstream from the chamber of the filter housing and upstream from the fluid outlet of the filter manifold; and
at least one controller in communication with the first temperature sensor, the second temperature sensor, and the valve through one or more leads, wherein the controller is configured to
receive temperature measurements through the one or more leads from the first temperature sensor and the second temperature sensor when a fluid is flowed the filter cartridge,
predict a filter cartridge leak based on the temperature measurements over time, and
execute one or more corrective actions when a leak is predicted, the one or more corrective actions including signaling the valve to stop a flow of fluid through the filter manifold.

2. A fluid filtration system as in claim 1, further comprising a user interface panel in communication with the controller through one or more signal line, wherein the one or more corrective actions of the controller comprise providing a signal for initiating a visible warning, audible warning, or both at the user interface panel.

3. The fluid filtration system of claim 1, wherein the filter cartridge includes a filter top that defines the outlet of the filter cartridge, and wherein the second temperature sensor is embedded within the filter top.

4. The fluid filtration system of claim 1, wherein the filter cartridge includes a filter top that defines the outlet of the filter cartridge, the top including a first pair of electrical contacts positioned therein, wherein one of the electrical contacts is connected to the first temperature sensor and the other of the electric contacts is connected to the second temperature sensor.

5. The fluid filtration system of claim 4, wherein the filter manifold includes an annular surface, including a second pair of electrical contacts positioned therein, wherein one electrical contact of the second pair of electrical contacts contacts one of the electrical contacts of the first pair of electrical contacts, and wherein the other electrical contact of the second pair of electrical contacts contacts the other electrical contact of the first pair of electrical contacts.

6. A refrigerator appliance comprising the fluid filtration system of claim 1.

7. A fluid filtering system, comprising: a filter manifold comprising:
 a filter manifold body defining a fluid inlet and a fluid outlet adapted for coupling the filter manifold to a fluid supply system;
 the filter manifold body including a boss defining a fluid return port fluidly connected with the fluid outlet, the filter manifold body further defining a fluid delivery port positioned proximate to the fluid return port, the fluid delivery port in fluid connection with the fluid inlet;
 a valve in upstream fluid communication with the filter manifold to control the flow of fluid thereto:
 a filter cartridge removably attached to the filter manifold, the filter cartridge comprising
 a filter housing defining a chamber;
 a filter element received into the chamber of the filter housing;
 a filter outlet for a flow of fluid from the filter element out of the chamber of the filter housing and into the fluid return port; and
 a filter inlet positioned proximate to the filter outlet and in fluid connection with the fluid delivery port of the filter manifold;
 a first temperature sensor configured for measuring the temperature of the filter cartridge, the first temperature sensor being embedded in the filter housing;
 a second temperature sensor configured for measuring the temperature of fluid passing through the filter outlet the second temperature sensor being positioned downstream from the chamber of the filter housing and upstream from the fluid outlet of the filter body manifold; and
 at least one controller in communication with the first temperature sensor and the second temperature sensor, wherein the controller configured to
 receive temperature measurements through the one or more leads from the first temperature sensor and the second temperature sensor when a fluid is flowed the filter cartridge,
 predict a filter cartridge leak based on the temperature measurements over time, and
 execute one or more corrective actions when a leak is predicted, the one or more corrective actions including stopping signaling the valve to stop a flow of fluid through the filter manifold.

8. The fluid filtrating system of claim 7, wherein the filter cartridge includes a filter top that defines the outlet of the filter cartridge, and wherein the second temperature sensor is embedded within the filter top.

9. The fluid filtrating system of claim 7, wherein the filter cartridge includes a filter top that defines the outlet of the filter cartridge, the top including a first pair of electrical contacts positioned therein, wherein one of the electrical contacts is connected to the first temperature sensor and the other of the electric contacts is connected to the second temperature sensor.

10. The fluid filtrating system of claim 9, wherein the filter manifold includes an annular surface, including a second pair of electrical contacts positioned therein, wherein one electrical contact of the second pair of electrical contacts contacts one of the electrical contacts of the first pair of electrical contacts, and wherein the other electrical contact of the second pair of electrical contacts contacts the other electrical contact of the first pair of electrical contacts.

11. The fluid filtrating system of claim 7, further comprising a user interface panel in communication with the controller through one or more signal line, wherein the one or more corrective actions of the controller comprise providing a signal for initiating a visible warning, audible warning, or both at the user interface panel.

* * * * *

UNITED STATES PATENT AND TRADEMARK OFFICE
CERTIFICATE OF CORRECTION

PATENT NO. : 9,533,894 B2
APPLICATION NO. : 14/052852
DATED : January 3, 2017
INVENTOR(S) : Natarajan Venkatakrishnan et al.

Page 1 of 1

It is certified that error appears in the above-identified patent and that said Letters Patent is hereby corrected as shown below:

In the Claims

In Column 8, Line 46, "sensor configured to" should read "sensor to";

In Column 9, Line 40, "thereto:" should read "thereto;";

In Column 10, Line 5, "outlet the" should read "outlet, the";

In Column 10, Line 22, "stopping signaling" should read "signaling".

Signed and Sealed this
Sixteenth Day of October, 2018

Andrei Iancu
*Director of the United States Patent and Trademark Office*